UNITED STATES PATENT OFFICE.

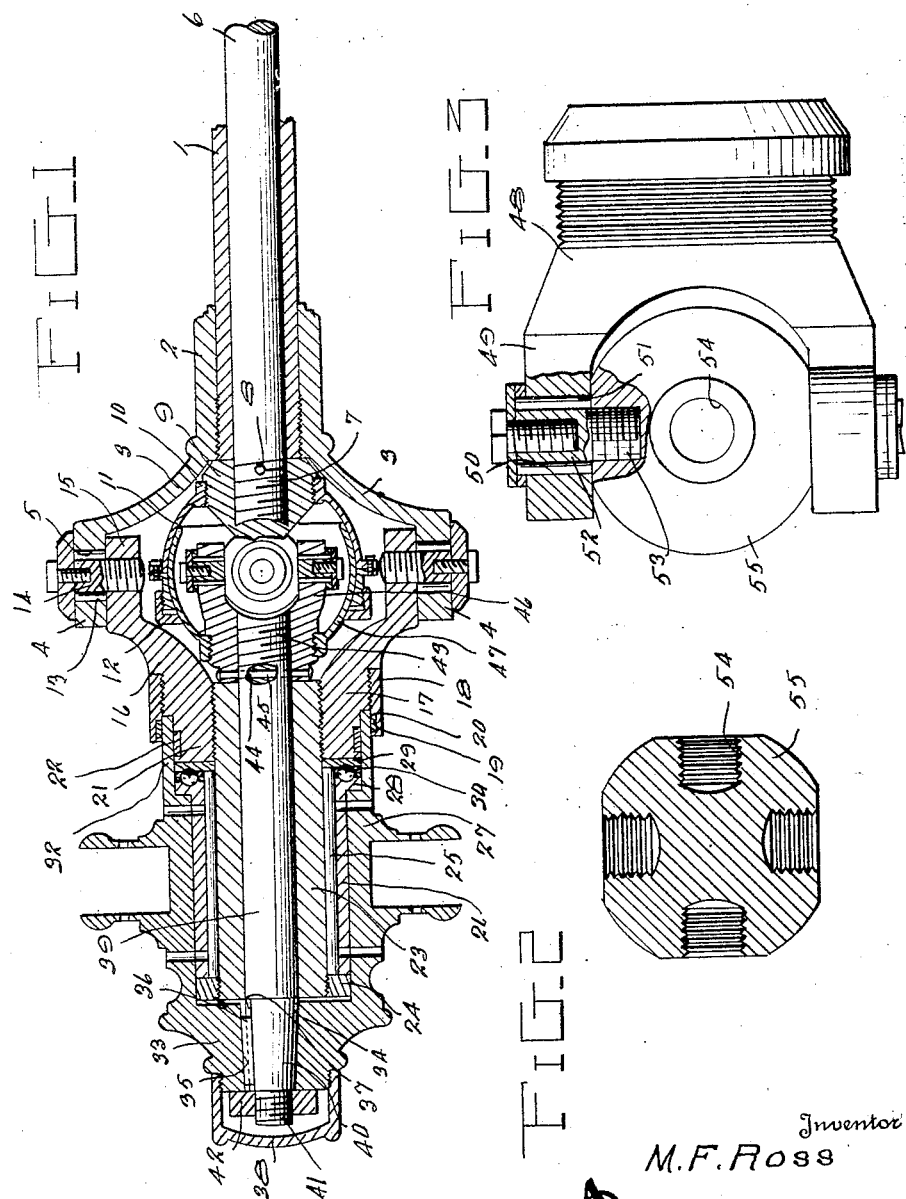

MATT F. ROSS, OF WINDFALL, INDIANA.

UNIVERSAL JOINT FOR FRONT-WHEEL DRIVES FOR MOTOR-VEHICLES.

1,186,134.

Specification of Letters Patent.

Patented June 6, 1916.

Application filed September 3, 1915. Serial No. 48,357.

*To all whom it may concern:*

Be it known that I, MATT F. ROSS, a citizen of the United States, residing at Windfall, in the county of Tipton and State of Indiana, have invented certain new and useful Improvements in Universal Joints for Front-Wheel Drives for Motor-Vehicles; and I do hereby declare the following to be a full, clear, and exact description of the invention, such as will enable others skilled in the art to which it appertains to make and use the same.

This invention relates to new and useful improvements in universal joints for front wheel drive for motor vehicles, and the principal object of the invention is to provide an axle provided with a joint allowing the wheels to be turned, which is also adapted for driving said wheels.

Still another object of the invention is to provide a novel form of universal joint, allowing for the free movement of the wheel, regardless of its position.

With these and other objects in view, the invention consists in the novel combination and arrangement of parts which will be fully set forth in the following specification and accompanying drawings, in which:—

Figure 1 is a longitudinal sectional view through a fragment of a front axle constructed in accordance with this invention, Fig. 2 is an enlarged sectional view through the universal coupling, and Fig. 3 is an enlarged view partly in section, of one of the housing connections.

Referring now to the drawings by character of reference, the numeral 1 designates the usual front axle, which is tubular in form and provided at each end with suitable screw heads on which the sleeve 2 is threaded. This sleeve is provided with the flared portion 3, which terminates in a suitable ear 4. There are preferably two flared portions 3, which extend from diametrically opposite points, as indicated, and each of these is formed with the ear 4, and each ear is provided with an opening 5, which alines with the opening in the opposite ear, as clearly shown in Fig. 1. Rotatably mounted in the axle 1, is the drive shaft 6, the forward end of which is screw threaded, as at 7, and provided with a transverse aperture 8, and threaded on this shaft is the universal housing connection 9, which is surrounded by the sleeve 10, on which is formed integrally the partially spherical housing 11 carrying at its extreme end a threaded cap 12. This housing 11 forms the inclosure for the universal joint which will be hereinafter more fully described.

An annular series of roller bearings 13 is mounted in each opening 5, and these bearings surround the shank of the cap screws 14, the inner extremities of which are threaded into the ears 15, formed on the arms 16, which in turn are formed integral with the sleeve 17. A suitable dust cap or band 18 surrounds the sleeve 17 and extends forwardly therefrom and is provided with a suitable annular groove 19 in which a packing 20 is retained. This extension projects over the reduced portion 21 of the sleeve 17, and this reduced portion 21 is formed with an annular groove 22 for the reception of a suitable packing. Threaded into the sleeve is the tubular bearing 23, in which the stub shaft, which will be hereinafter more fully described, is mounted. This bearing 23 is provided at its extreme outer end with external screw threads, on which a suitable retaining ring 24 is threaded; and surrounding the bearing is an annular series of bearing rollers 25 which are housed within the bushing 26 of the hub 27. This bushing is formed with an annular flange 28 at its extreme inner end, which coöperates with a ring 29 and ball bearings 30 in forming a bearing at the extreme outer end of the reduced extension 21 of the sleeve 17. A suitable cylindrical extension 32 is formed on the hub and lies over the reduced portion 21 and between said reduced portion and the dust band, so as to exclude dust from any part of the device.

The hub is provided at its opposite end with the integral cap portion 33, which is formed with a tapered opening 34 and a suitable groove or key-way 35. This groove or key-way is adapted for the reception of the key 36, which also extends into the groove or key-way 37 formed in the stub shaft, which will be more fully hereinafter described. A suitable hub cap 38 is threaded on the cap portion 33 and excludes dust from the stub axle herein before referred to.

Mounted in the bearing sleeve 23 is the stub shaft 39 above mentioned, and this stub shaft is provided with the tapered extension 40 which coöperates with the tapered opening 34, and is provided with the reduced threaded extension 41 on which the nut 42 is threaded. The opposite end of this shaft is screw threaded, as at 43, and provided with a transverse bore 44 for the reception of a pin 45. This pin extends through the bore and through an opening formed in the sleeve 46, which is provided with external screw threads, over which the universal joint housing 47 is threaded. This housing 47 coöperates with the housing 11 above referred to, in completely inclosing the universal joint, which will be more fully hereinafter described.

The sleeves 9 and 46 are identical in construction, and each comprises a tapered body 48 which is formed with the forwardly extending ears 49 having therein a bore 50 which alines with the bore in the opposite ear, and mounted in said bore are annular series of bearings 51, which engage the outer cylindrical portion of the stem 52 of the pivot pin, the screw threaded portion 53 of which engages in one of the screw threaded openings 54 formed in a spherical member 55 of the universal joint.

It will be apparent from the foregoing that in use, the power is applied to the drive shaft 6 and will be transmitted through the universal joint to the stub shaft 39, from whence it will be transmitted by means of the key 36 to the hub cap section 33 and thence to the hub 27. The universal joint will permit the device to turn in any direction and it will be apparent that the controlling of the vehicle may be readily accomplished.

While in the foregoing there has been shown and described the preferred embodiment of this invention, it is to be understood that such changes may be made in the combination and arrangement of parts as will fall within the spirit and scope of the appended claim.

What is claimed is:—

In a universal joint, a pair of forked members arranged in planes at right angles to each other, a ball adapted to fit between the forked members, said ball being provided with four flat faces, the flat faces having internally threaded bores extending axially therein and being adapted to be engaged by the inner faces of the forked members, studs threaded into the bores in the ball and adapted to project through the forked members to pivotally mount the forked members on the ball, roller bearings surrounding the studs, the inner ends of said bearings resting on the flat faces of the ball, the studs being provided with internally threaded bores, a cap screw adapted to be threaded into each bore, a washer surrounding each cap screw and bearing on the outer end of its respective stud, the washers limiting the outward movement of the rollers and a ring surrounding each set of rollers, and interposed between the washers and the forks of the forked members.

In testimony whereof I affix my signature in presence of two witnesses.

MATT F. ROSS.

Witnesses:
  F. M. FISHER,
  B. F. TROUT.